US012507110B2

United States Patent
Du et al.

(10) Patent No.: US 12,507,110 B2
(45) Date of Patent: Dec. 23, 2025

(54) CELL ACTIVATION

(71) Applicant: NOKIA TECHNOLOGIES OY, Espoo (FI)

(72) Inventors: Lei Du, Beijing (CN); Lars Dalsgaard, Oulu (FI); Parham Kazemi, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/922,654

(22) Filed: Oct. 22, 2024

(65) Prior Publication Data
US 2025/0254554 A1   Aug. 7, 2025

(30) Foreign Application Priority Data
Feb. 7, 2024   (WO) ................ PCT/CN2024/076808

(51) Int. Cl.
*H04W 24/10* (2009.01)
*H04B 7/06* (2006.01)
*H04W 72/21* (2023.01)

(52) U.S. Cl.
CPC .......... *H04W 24/10* (2013.01); *H04B 7/0626* (2013.01); *H04W 72/21* (2023.01)

(58) Field of Classification Search
CPC ..... H04W 24/10; H04W 72/21; H04W 16/28; H04W 74/006; H04W 74/0833; H04W 74/0838; H04B 7/0626; H04B 17/328; H04B 7/0695; H04B 7/0639
See application file for complete search history.

(56) References Cited

U.S. PATENT DOCUMENTS

| 12,185,256 | B2 * | 12/2024 | Cui | H04W 52/146 |
| 12,185,296 | B2 * | 12/2024 | Zhou | H04W 72/046 |
| 12,212,511 | B2 * | 1/2025 | Zhou | H04L 5/005 |
| 12,294,083 | B2 * | 5/2025 | Furukawa | H01M 4/485 |
| 12,302,180 | B2 * | 5/2025 | Dimnik | H04W 36/00835 |
| 12,336,045 | B1 * | 6/2025 | Koskinen | H04W 24/08 |

(Continued)

FOREIGN PATENT DOCUMENTS

| CN | 116418471 A | 7/2023 |
| WO | 2023/000301 A1 | 1/2023 |

(Continued)

OTHER PUBLICATIONS

CATT, "WF on further RRM enhancement for NR and MR-DC—PUCCH SCell activation/deactivation requirements", 3GPP TSG-RAN WG4 Meeting !101bis-e, R4-2202768, Jan. 17-25, 2022, 7 pages (Year: 2022).*

(Continued)

*Primary Examiner* — Brian T O Connor
(74) *Attorney, Agent, or Firm* — ALSTON & BIRD LLP

(57) ABSTRACT

Embodiments of the present disclosure disclose devices, methods and apparatuses for cell activation. In the embodiments, a terminal determines a pathloss-reference signal (PL-RS) as known for a secondary cell (SCell) with an uplink based on at least one measurement result or a measurement report. The measurement report is triggered due to a cell activation command. Then, the terminal device activates, based on the PL-RS determined as known, the SCell within a first time period. In this way, communication performance related to the carrier aggregation operations can be improved.

20 Claims, 8 Drawing Sheets

(56) References Cited

U.S. PATENT DOCUMENTS

| | | | |
|---|---|---|---|
| 2022/0053538 A1* | 2/2022 | Akkarakaran | H04B 7/063 |
| 2023/0023600 A1* | 1/2023 | Cirik | H04W 52/242 |
| 2023/0063137 A1* | 3/2023 | Matsumura | H04B 7/088 |
| 2023/0101089 A1* | 3/2023 | Cui | H04W 52/367 |
| | | | 455/522 |
| 2023/0171788 A1* | 6/2023 | Kung | H04B 7/0695 |
| | | | 370/329 |
| 2023/0199763 A1* | 6/2023 | Matsumura | H04W 72/1273 |
| | | | 370/329 |
| 2024/0056203 A1* | 2/2024 | Yi | H04L 5/0048 |
| 2024/0063991 A1* | 2/2024 | Liu | H04L 5/001 |
| 2024/0196239 A1* | 6/2024 | Li | H04W 76/15 |
| 2024/0214854 A1* | 6/2024 | Yuan | H04W 24/10 |
| 2024/0214946 A1* | 6/2024 | Yuan | H04W 52/146 |
| 2024/0251468 A1* | 7/2024 | Yang | H04B 7/0639 |
| 2024/0297771 A1* | 9/2024 | Li | H04B 17/328 |
| 2024/0357513 A1* | 10/2024 | Shen | H04W 52/14 |
| 2025/0047373 A1* | 2/2025 | Li | H04B 7/1851 |

FOREIGN PATENT DOCUMENTS

| | | |
|---|---|---|
| WO | 2023/069626 A1 | 4/2023 |
| WO | 2023/125203 A1 | 7/2023 |
| WO | 2023/151020 A1 | 8/2023 |
| WO | 2023/206012 A1 | 11/2023 |

OTHER PUBLICATIONS

International Search Report and Written Opinion dated Aug. 14, 2024 corresponding to International Patent Application No. PCT/CN2024/076808.

Huawei et al., "Discussion on the testability of pathloss-RS activation delay," R4-2118829, 3GPP TSG-RAN WG4 Meeting #101-e, Electronic Meeting, Nov. 12, 2021.

"3rd Generation Partnership Project; Technical Specification Group Radio Access Network; NR; Requirements for support of radio resource management (Release 18)", 3GPP TS 38.133 v18.4.0, (Dec. 2023), 6296 pages.

Apple et al., "Big CR to TS 38.133 on R18 SCell activation enhancement", 3GPP TSG-RAN WG4 Meeting #109, R4-2321361, (Nov. 13-17, 2023), 26 pages.

Apple, "Discussion on PUCCH SCell activation and deactivation", 3GPP TSG-RAN WG4 Meeting #102-e, R4-2203786, (Feb. 21-Mar. 4, 2022), 7 pages.

CATT, "WF on further RRM enhancement for NR and MR-DC—PUCCH SCell activation/deactivation requirements", 3GPP TSG-RAN WG4 Meeting #101bis-e, R4-2202768, (Jan. 17-25, 2022), 7 pages.

Qualcomm Incorporated, "draftCR on FR2 unknown SCell activation with L3 report", 3GPP TSG-RAN4 Meeting #108bis, R4-2317412, (Oct. 9-13, 2023), 5 pages.

Moderator (CATT), "Email discussion summary for [101-bis-e][208] NR_RRM_enh2_3", 3GPP TSG-RAN WG4 Meeting #101bis-e, (Jan. 17-25, 2022), 28 pages.

Moderator (Samsung), "Email discussion summary for [98e][216] NR_eMIMO_RRM", 3GPP TSG-RAN WG4 Meeting #98-e, R4-2103455, (Jan. 25-Feb. 5, 2020), 48 pages.

Office Action for Taiwanese Application No. 114101833 dated Oct. 13, 2015, 30 pages.

* cited by examiner

CELL ACTIVATION

CROSS-REFERENCE TO RELATED APPLICATION

This application claims priority to, and the benefit of, PCT application No. PCT/CN 2024/076808, filed Feb. 7, 2024, the contents of which are hereby incorporated by reference in their entirety.

FIELD

Embodiments of the present disclosure generally relate to the field of telecommunication, and in particular, to devices, methods, apparatuses and computer readable storage medium for cell activation.

BACKGROUND

With the development of communication technology, the carrier aggregation (CA) technology has been introduced to improve spectrum flexibility. By means of CA, the transmission bandwidth can be further extended, where multiple component carriers are aggregated and jointly used for transmission to/from a single device. Generally, carrier aggregation is described using the term "cell", that is, a carrier-aggregation-capable device is able to receive and transmit from/to multiple cells. One of these cells is referred to as the primary cell (PCell). This is the cell which the device initially finds and connects to, after which one or more secondary cells (SCells) can be configured once the device is in connected mode. The secondary cells can be activated or deactivated to meet the variations in the traffic pattern.

SCells may be configured for downlink reception or uplink transmission of terminal devices. Compared to downlink-only SCell, additional uplink actions may be required for activating a SCell with uplink.

SUMMARY

In general, example embodiments of the present disclosure provide devices, methods, apparatuses and computer readable storage medium for cell activation.

In a first aspect, there is provided a terminal device. The terminal device may comprise at least one processor; and at least one processor coupled with the at least one memory and configured to cause the terminal device to: determine a pathloss-reference signal (PL-RS) as known for a secondary cell (SCell) with an uplink based on at least one measurement result or a measurement report. The measurement report is triggered due to a cell activation command. The terminal device is further caused to activate, based on the PL-RS determined as known, the SCell within a first time period.

In a second aspect, there is provided a network device. The network device may comprise at least one processor; and at least one memory storing instructions that, when executed by the at least one processor, cause the network device to: transmit, to a terminal device, a cell activation command for a secondary cell (SCell). The network device is further caused to: receive, from the terminal device, a measurement report triggered by the cell activation command; and determine, based on the measurement report, that a pathloss-reference signal (PL-RS) is known for the SCell.

In a third aspect, there is provided a method implemented at a terminal device. The method comprises: determining, by the terminal device, a pathloss-reference signal (PL-RS) as known for a secondary cell (SCell) with an uplink based on at least one measurement result or a measurement report. The measurement report is triggered due to a cell activation command. The method further comprises activating the SCell within a first time period based on the PL-RS determined as known.

In a fourth aspect, there is provided a method implemented at a network device. The method comprises: transmitting, by the network device and to a terminal device, a cell activation command for a secondary cell (SCell). The method further comprising: receiving, from the terminal device, a measurement report triggered by the cell activation command; and determining, based on measurement report, that a pathloss-reference signal (PL-RS) is known for the SCell.

In a fifth aspect, there is provided an apparatus. The apparatus comprises: means for determining a pathloss-reference signal (PL-RS) as known for a secondary cell (SCell) with an uplink based on at least one measurement result or a measurement report, wherein the measurement report is triggered due to a cell activation command; and means for activating, based on the PL-RS determined as known, the SCell within a first time period.

In a sixth aspect, there is provided an apparatus. The apparatus comprises: means for transmitting, to a terminal device, a cell activation command for a secondary cell (SCell); means for receiving, from the terminal device, a measurement report triggered by the cell activation command; and means for determining, based on the measurement report, that a pathloss-reference signal (PL-RS) is known for the SCell.

In a seventh aspect, there is provided a non-transitory computer readable medium comprising program instructions for causing an apparatus to perform at least the method according to the third aspect to the fourth aspect.

In an eighth aspect, there is provided a terminal device. The terminal device comprises a determination circuitry configured to determine a pathloss-reference signal (PL-RS) as known for a secondary cell (SCell) with an uplink based on at least one measurement result or a measurement report. The measurement report is triggered due to a cell activation command. The terminal device further comprises an activation circuitry configured to activate, based on the PL-RS determined as known, the SCell within a first time period.

In a ninth aspect, there is provided a network device. The network device comprises a transmitting circuitry configured to transmit, to a terminal device, a cell activation command for a secondary cell (SCell); a receiving circuitry configured to receive, from the terminal device, a measurement report triggered by the cell activation command; and a determination circuitry configured to determine, based on the measurement report, that a pathloss-reference signal (PL-RS) is known for the SCell.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
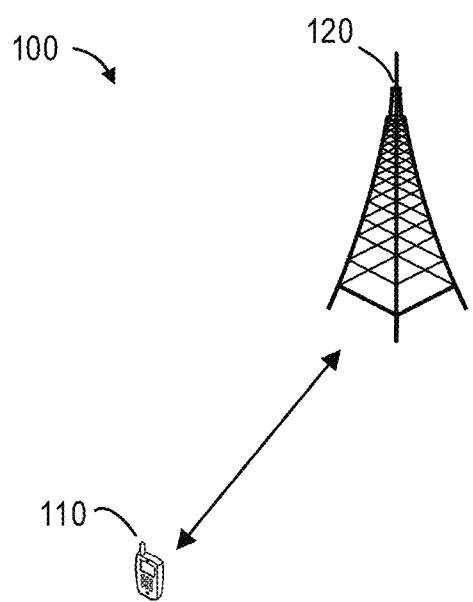
FIG. 1A illustrates an example network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein may be implemented in various manners other than the ones described below.

In the following description and claims, unless defined otherwise, all technical and scientific terms used herein have the same meaning as commonly understood by one of ordinary skills in the art to which the present disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It may be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as long term evolution (LTE), LTE-advanced (LTE-A), wideband code division multiple access (WCDMA), high-speed packet access (HSPA), narrow band Internet of things (NB-IoT) and so on. Furthermore, the communications between a terminal device and a network device in the communication network may be performed according to any suitable generation communication protocols, including, but not limited to, the third generation (3G), the fourth generation (4G), 4.5G, the fifth generation (5G) communication protocols, 5G-A, and/or beyond. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In this disclosure, the unknown secondary cell (SCell) may refer to the SCell on which the terminal device performs no sufficient measurement or has not sent any valid measurement report within a certain time period before receiving SCell activation command. Furthermore, whether a path loss (PL)-reference signal (RS) is known or unknown for a cell (for example, an unknown SCell) depends on one or more conditions. That is, the term "known/unknown" has different and separate meanings with respect to the "SCell" or "PL-RS".

As mentioned above, compared to downlink-only SCell, additional uplink actions may be required for activating a SCell with uplink e.g. random access procedure to acquire the UL timing advance of the SCell and the PL-RS measurement to determine the UL transmit power to transmit on the SCell. With respect to an unknown SCell configured with uplink (for example, an unknown physical uplink control channel, PUCCH, SCell i.e. a SCell configured with PUCCH), the terminal device may need to perform one or more additional tasks compared to the case where the PUCCH SCell is known. These additional tasks may include, for example the cell detection, automatic gain control (AGC), time/frequency synchronization (or cell detection) and L1-received signal reference power (RSRP) measurement and a transmission of the beam information via the L1-RSRP reporting to the network. Generally, the activation of the unknown SCell can be completed by finally transmitting a valid channel state information (CSI) report from the terminal device to the network. For activating a SCell with PUCCH, the CSI report needs to be transmitted on the PUCCH SCell. In turn, to transmit the valid CSI report, the terminal device should determine an uplink transmit power which may be determined based on a path loss (PL)-reference signal (RS) that is determined as known for the unknown SCell. Moreover, whether the PL-RS is determined to be known or unknown depends on whether one or more pre-defined conditions are met. Therefore, to improve the SCell activation flexibility, how to define the conditions for determining whether the PL-RS is known is a key aspect. Only for discussion clarity, some technical details regarding the SCell activation procedure are further discussed with reference to FIGS. 1B and 1C.

In view of the above and in order to improve the performance of communication system, a scheme for cell activation is provided. In this scheme, after receiving a cell activation command for a (unknown) SCell configured with uplink, a terminal device is able to determine a pathloss-reference signal (PL-RS) as known for the SCell based on at least one measurement result or a measurement report. This measurement report is triggered due to a cell activation command, for example, the measurement report may include a Layer 1 (L1) measurement report and/or a Layer 3 (L3) measurement report having the at least one measurement result. Then, based on that the PL-RS is determined as known for the SCell, the terminal device activates the SCell within a first time period without any unexpected delay. For example, the terminal device transmits a valid CSI-report within the first time period.

In this way, during the SCell activation procedure, the terminal device may determine whether the PL-RS is known or not in a more flexible manner, for example, based on more than one type of measurement report, even only based on the measurement results. As such, the SCell activation related performance can be improved, for example, the activation delay can be reduced.

Principle and embodiments of the present disclosure will be described in detail below with reference to the accompanying drawings. FIG. 1A illustrates an example network environment 100 in which example embodiments of the present disclosure may be implemented. The environment 100, which may be a part of a communication network, includes terminal devices and network devices.

As illustrated in FIG. 1A, the network environment 100 may include a terminal device 110 and a network device 120. Without any limitation, the terminal device 110 and the network device 120 may be any other devices having the similar sensing requirements or functionalities. For example, the terminal device 110 may be an internet of things (IoT), user equipment (UE), wireless device, a subscriber station (SS), a portable subscriber station, a mobile station (MS), or an access terminal (AT) that requires to access the network. The network device 120 may be a base station (BS) or an access point (AP), for example, a node B (NodeB or NB), an evolved NodeB (eNodeB or eNB), a NR NB (also referred to as a gNB), a remote radio unit (RRU), a radio header (RH), a remote radio head (RRH), relay and so on.

It is to be understood that the number of devices in FIG. 1A is given only for the purpose of illustration without suggesting any limitations. The network environment 100 may include any suitable number of network devices and/or terminal devices adapted for implementing embodiments of the present disclosure. Although not shown, it would be appreciated that one or more terminal devices may be located in the network environment 100.

Communications in the network environment 100 may be implemented according to any proper communication protocol(s), comprising, but not limited to, the third generation (3G), the fourth generation (4G), the fifth generation (5G), 5G-Advanced or beyond (6G), wireless local network communication protocols such as institute for electrical and electronics engineers (IEEE) 802.11 and the like, and/or any other protocols currently known or to be developed in the future. Moreover, the communication may utilize any proper wireless communication technology, comprising but not limited to: multiple-input multiple-output (MIMO), orthogonal frequency division multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), carrier aggregation (CA), dual connectivity (DC), and new radio unlicensed (NR-U) technologies.

Figure 1B:
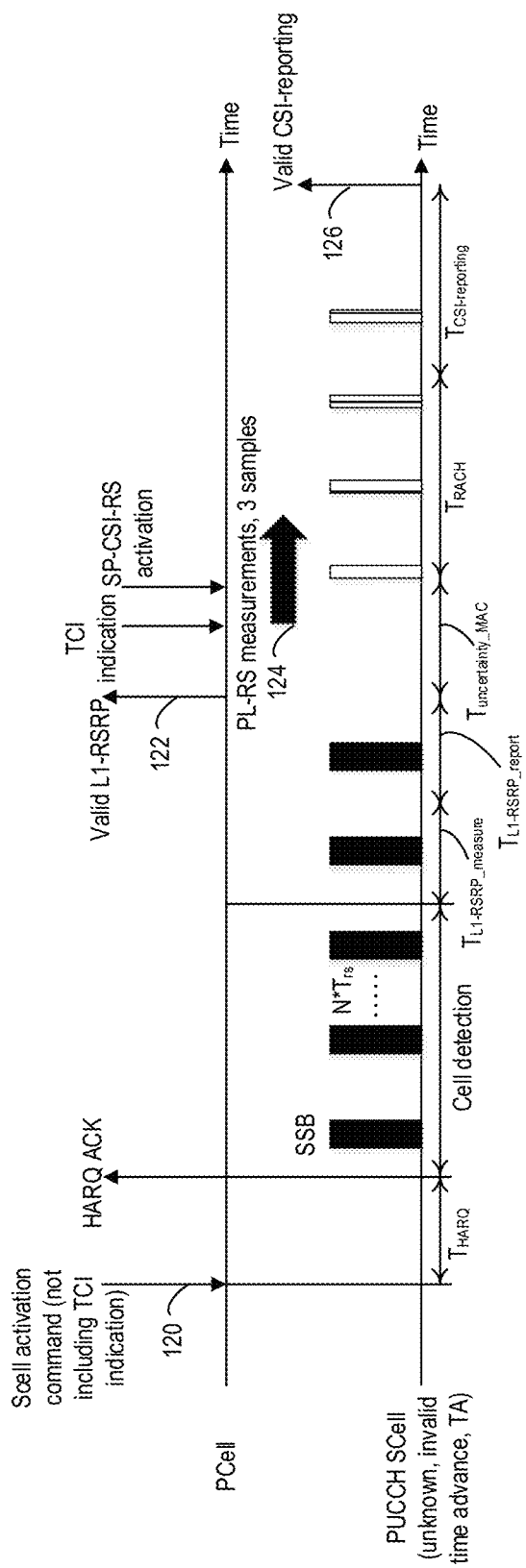
FIG. 1B illustrates an example of SCell activation procedure based on a L1 measurement report.

FIG. 1B illustrates an example of SCell activation procedure based on a L1 measurement report.

As discussed above, if PUCCH is configured on PUCCH SCell, the terminal device may need additionally activate uplink actions comparing with activating a legacy downlink only SCell, and a valid CSI report will be transmitted on PUCCH SCell as the ending point of PUCCH SCell activation. To transmit the valid CSI report, the terminal device shall determine the uplink transmit power based on a PL-RS. Furthermore, a PUCCH SCell activation delay requirement (i.e., the above first time period) is defined. The PUCCH SCell activation delay applies only when the determined PL-RS is known (i.e., the valid CSI-report may be transmitted within the activation delay requirement). Otherwise, a longer activation delay is expected. One reason to have a definition of "PL-RS is known" is to make sure that the terminal device knows which PL-RS can be used for determining the DL received reference signal power, in order to determine the UL Tx power for a given active UL spatial setting/UL TCI state. Specifically, how to determine whether the PL-RS is "known" is discussed as below.

Generally, the pathloss reference signal is known for unknown PUCCH SCell during activation if the following conditions are met during the period between the last transmission of the reference signal (RS) resource used for L1-RSRP measurement reporting and the completion of PUCCH SCell activation. This RS resource may be the target pathloss reference signal or quasi-located (QCLed) with the target pathloss reference signal in Type D. The conditions include:

The PUCCH SCell activation command is received within 1280 ms upon the last transmission of the RS resource used for L1-reference signal received power (RSRP) measurement reporting;

The target pathloss reference signal determination is based on the latest L1-RSRP measurement reporting;

The target pathloss reference signal remains detectable during the PUCCH SCell activation period;

SNR of the target pathloss reference signal≥−3 dB;

The associated SSBs with the target pathloss reference signal remain detectable during the PUCCH SCell activation period; and SNR of the associated SSB≥−3 dB.

Otherwise, the PL RS is unknown. Then, the conditions of the "known PL RS" or "unknown PL RS" will affect whether the delay requirement shall be applied to the SCell activation procedure. Specifically, the above delay requirement shall apply provided that: the target pathloss reference signal determined during PUCCH SCell activation is known. Otherwise longer activation time is expected if the pathloss reference signal is unknown. The random access (RA) on PUCCH SCell is not interrupted by the RA on the primary cell (PCell) otherwise additional delay to activate the SCell is expected; and no SRS carrier based switching or SRS antenna port switching occurs during the SCell activation procedure otherwise the PUCCH SCell activation delay can be extended.

In the specific example as shown in FIG. 1B, assuming that the PUCCH SCell is an FR2 unknown SCell, for example, the terminal device has not sent a valid measurement reporting within a certain time period before receiving the SCell activation command.

At 120, the terminal device receives a SCell activation command from the network. Accordingly, after receiving the SCell activation command, the terminal device transmits a hybrid automatic repeat request (HARQ)-acknowledge (ACK) to the network. Then, the terminal device may perform the cell detection, time/frequency synchronization, a cell measurement based on reference signals transmitted via the SCell, for example, a synchronization signal and physical broadcast channel (SSB) or a channel state information-reference signal (CSI-RS).

In addition, the SCell activation command may trigger an L1-RSRP reporting. The terminal device includes the measurement results of the reference signals into the L1-RSRP report, and transmits the L1-RSRP report at 122. The terminal device may determine the PL-RS is known based on the L1-RSRP. Once the network receives the L1-RSRP report, the network would be able to determine the suitable transmission configuration indicator (TCI) state to be used, including the uplink (UL) spatial relation, based on the L1-RSRP report. The terminal device needs to have suitable DL measurements for the correct associated PL-RS. Otherwise, the PL-RS is considered as unknown and the terminal device may need some unexpected time to determine a PL-RS for measurement.

As the PL-RS is associated with the UL spatial relation, the PL-RS may be currently defined as known if it is determined based on the latest L1-RSRP measurement reporting. In the case that PL-RS is known, i.e., determining which PL-RS can be used for measuring, the terminal device may further determine the uplink transmit power by measuring further PL-RS samples 124. That is, the PL-RS is used by the terminal device to determine the uplink transmit power, and the terminal device therefore needs to determine the PL-RS before the UE can initiate any UL transmission (PL-RS has to be determined as known so that the cell activation can be completed within a certain time period). Generally, to generate the valid CSI report, a certain number of further PL-RS samples are required to be measured, for example, five PL-RS samples, such that the uplink transmit power can be determined.

Based on the pathloss estimation derived from the PL-RS, the terminal device is able to determine the UL transmit power for transmitting the valid CSI report on the PUCCH SCell. As shown in FIG. 1B, it shows the case where UE does not have a valid time advance (TA), hence the terminal device performs random access procedure to acquire UL timing before sending the valid CSI report. For both valid and invalid TA case, the PL-RS needs to be measured in order to transmit the valid CSI report 126 on PUCCH SCell. In this case, the SCell activation procedure is completed by transmitting the valid CSI report. In this example procedure, whether the PL-RS is known only depends on the L1-measurement report, i.e., L1 RSRP report.

To enhance the SCell activation, one improvement was proposed to enable the terminal device to send an L3 measurement report after the (PUCCH) SCell activation command for an unknown SCell. This enables, for example, the terminal device to give an earlier indication of which DL 'beam' that can be used by the network for scheduling the terminal device.

Figure 1C:
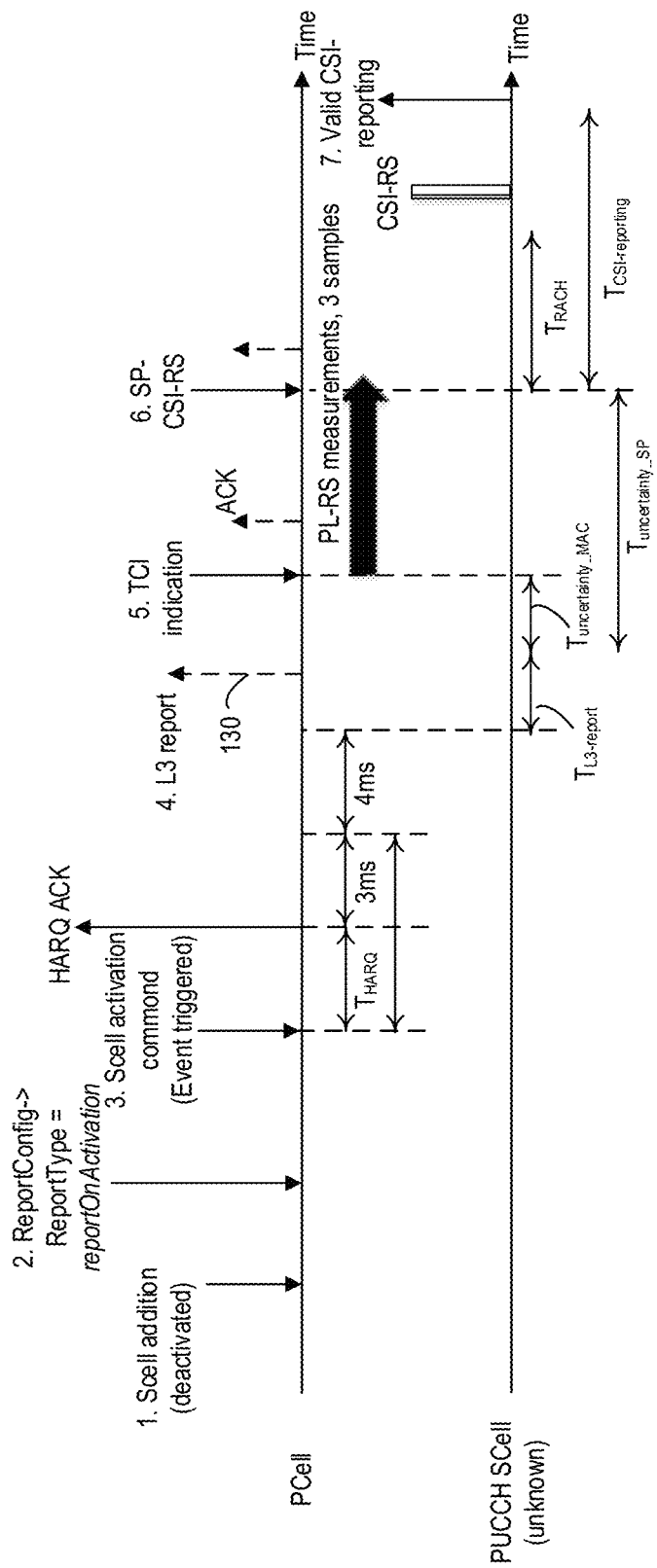
FIG. 1C illustrates an example of SCell activation command-triggered L3 measurement report.

FIG. 1C illustrates an example of SCell activation command-triggered L3 measurement report.

As shown in FIG. 1C, the network may inform a terminal device that a SCell is added for the terminal device, and the SCell is at deactivated mode initially. In addition, the network may transmit a report configuration for a L3 measurement report that is triggered by the SCell activation command. After receiving the report configuration, the terminal device is aware that the L3 measurement report can be transmitted in response to a SCell activation command. In this case, upon receiving the Scell activation command, the terminal device may include measurement results into a L3 measurement report to be transmitted. For example, the terminal device may transmit an L3 report 130 after SCell activation command to inform network the DL beam information. In this case, the network may be able to send TCI activation command based on the L3 report and the terminal device may not transmit an L1-RSRP report. In this way, actually, the target PL-RS may be determined based on operations associated with L3 measurement report.

However, in the situation where the terminal does send an L3 measurement report to the network triggered by the SCell activation, the definition of "PL-RS is known" that is based on the L1 measurement report may be incorrect and needs to be updated to reflect that the terminal sends L3 report after SCell activation command.

Therefore, how to define "PL-RS is known" for unknown PUCCH SCell activation when L3 report is triggered due to SCell activation should be considered. In this disclosure, the terminal device can determine (or selects) the target PL-RS based on the measurement results included in the L3 measurement report, when the L3 report is triggered due to receiving SCell activation command. Then, the terminal device shall be able to activate the PUCCH SCell within a time period as if the PL-RS is known, based on the selected the PL-RS.

Figure 2:
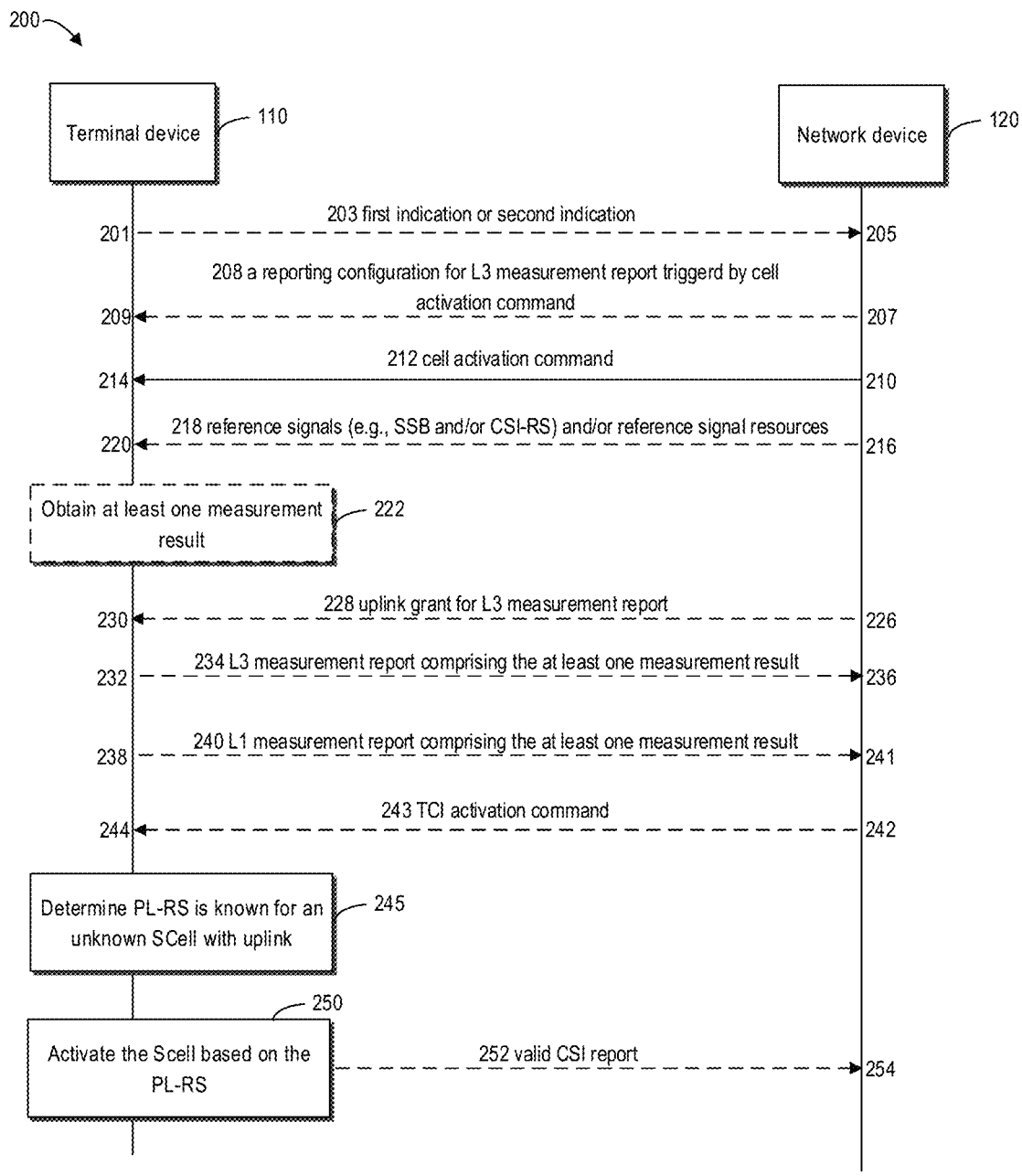
FIG. 2 illustrates an example signaling process for cell activation according to example embodiments of the present disclosure.

FIG. 2 illustrates an example signaling process 200 for cell activation according to example embodiments of the present disclosure. For the purpose of discussions, the signaling process 200 will be described with reference to FIG. 1A. It would be appreciated that although the signaling process 200 has been described in the communication environment 100 of FIG. 1A, this flowchart 200 may be likewise applied to other communication scenarios.

In the signaling process 200, the network device 120 transmits (210) a cell activation command 212 for activating a SCell (for example, an unknown PUCCH SCell) to the terminal device 110. In an example, the network device 120 may transmit (207) a reporting configuration 208 for L3 measurement report that may be triggered by the cell activation command 212. Upon receiving (209) the reporting configuration 208, the terminal device 110 is aware that the terminal device 110 is allowed to transmit the L3 measurement report if available in response to the command 212. In addition or alternatively, the report configuration 208 may be directly carried in the SCell activation command 212. Alternatively, the report configuration 208 may be informed to the terminal device 110 in any other ways. The terminal device 110 receives (214) the cell activation command 212 accordingly.

In some embodiments, the cell activation command 212 may trigger a corresponding L3 measurement report. In this case, the PL-RS may be determined as known if it is based on the L3 report.

In addition or alternatively, the cell activation command 212 may trigger both a corresponding L3 measurement report and a corresponding L1 measurement report, for example, L1-RSRP report. In this case, the terminal device 110 may perform the SCell activation procedure as similar to the procedure as shown in FIG. 1B, even if the terminal device 110 is configured with L3 measurement report after SCell activation command (i.e., the L3 measurement report may be triggered by the SCell activation command 212). For example, if the network device 120 does not initiate TCI activation command immediately after receiving the L3 report and the terminal device 110 completes L1-RSRP measurement, it may be able to transmit L1-RSRP report following L3 report before receiving TCI activation command. In this case, the PL-RS may be determined as known based on either the L3 report or the L1-RSRP report. For discussion clarity, the determination regarding whether the PL-RS is known is further discussed with signaling (228, 234 and 240).

Therefore, the terminal device 110 may transmit either the L1 measurement report or the L3 measurement report, or transmit both the L1 measurement report and the L3 measurement report, if the SCell activation command 217 is received. Correspondingly, the network device 120 can determine TCI states based on the L1 measurement report and/or L3 measurement report. In particular, the network device 120 can determine TCI states based on the L3 measurement report if the terminal device 110 only transmits L3 reporting before receiving TCI activation command. Alternatively, the network device 120 can determine TCI states based on either the L3 measurement report or L1 measurement report if UE sends both L3 reporting and L1 reporting before receiving TCI activation command.

Still referring to FIG. 2, to activate the unknown SCell, based on at least one measurement result or a measurement report, the terminal device 110 determines (245) that a pathloss-reference signal (PL-RS) is known for this SCell. As mentioned above, the measurement report may be the L3 measurement report having the at least one measurement result. In addition or alternatively, the measurement report may be the L1 measurement report having the at least one measurement result. In some embodiments, as shown in FIG. 2, the network device 120 may transmit (216) reference signals for the SCell to be activated, for example, the unknown PUCCH SCell. In an example, the reference signals may include SSB, CSI-RS, and so on. Accordingly, the terminal device 110 may perform (220) the measurements to obtain (222) the at least one measurement result. Then, if the L3 measurement report and/or the L1 measurement report can be transmitted, the terminal device 110 may include the measurement result into the L3 measurement report and/or the L1 measurement report.

In the example in which the SCell activation command can trigger the L3 measurement report, the network device 120 may further transmit (226) an uplink grant for the L3 measurement report triggered by the SCell activation command 212. Upon receiving (230) the uplink grant 228, the terminal device 110 may transmit 232 the L3 measurement report 234 including the measurement results of the RS(s). After receiving (236) the L3 measurement report 234, the network device 120 may determine the TCI states based on the L3 measurement report 234 accordingly and sends (242) the TCI activation command 243. The TCI activation command 243 may explicitly or implicitly indicate the target PL-RS to be used for activating the SCell. Then, the terminal device 110 may determine the PL-RS as known for the SCell to be activated if the target PL-RS is based on the transmitted L3 measurement report 234. In some embodiments, if the L3 measurement report 234 is transmitted and the TCI activation command 243 is received, the terminal device 110 may not transmit the L1 measurement report triggered by the SCell activation command 212. That is, the terminal device 110 only sends L3 report 234 after SCell activation command 212 and before TCI activation command 243. In this way, the PL-RS can be determined as known in a more flexible way, so that the duration of SCell activation procedure is reduced. Moreover, if the PL-RS is determined as known based on the L3 measurement report triggered by the SCell activation command 217, the terminal device 110 may determine the uplink transmit power by performing no measurement on further PL-RS samples, or performing the measurement on lower number of PL-RS samples. For discussion clarity, the PL-RS sample measurement related to L3 measurement report is further discussed as below with reference to signaling 203, but not discussed here.

In addition or alternatively, the terminal device 110 may also transmit the L1 measurement report. For example, the network device 110 does not schedule the L3 measurement report 234, i.e., the network device 110 transmits no uplink grant for the L3 measurement report. In this case, the terminal device 110 may transmit (238) the L1 measurement report 240 having the measurement results to the network device 120. In turn, after receiving (241) the L1 measurement report 240, the network device 120 may determine the TCI activation command based on the L1 measurement report accordingly, and transmit (242) the TCI activation command 243. In this case, the PL-RS is determined as known for the SCell to be activated based on the L1 measurement report 240.

Without any limitation, the terminal device 110 may also transmit both the L3 measurement report 234 and the L1 measurement report 240. For example, the network device 110 schedules UL grant for UE to transmit the L3 measurement report 234, i.e., the network device 110 transmits uplink grant for the L3 measurement report. However, network does not send TCI activation command for some reason. In this case, the terminal device 110 may also transmit (238) the L1 measurement report 240 having the measurement results to the network device 120. In turn, after receiving (236 and 241) the both L3 measurement report 234 and L1 measurement report 240, the network device 120 may determine the TCI states and send (242) TCI activation command 243 based on either the L3 report or the L1 measurement report accordingly. Similarly, the terminal device 110 may determine the PL-RS as known for the SCell to be activated based on the transmitted L3 measurement report 234 and/or L1 measurement report 240. Correspondingly, once transmitting the measurement report (for example, the L1 and/or L3 measurement report) and receiving TCI activation command, the terminal device 110 may be aware that that the PL-RS is known for the SCell to be activated.

In addition or alternatively to the measurement report, in some embodiments, if the L3 measurement report 234 and/or the L1 measurement report 240 are not transmitted, the terminal device 110 may determine the PL-RS as known based on measurement results of the RS(s). For example, after or before receiving the command 212, the terminal device 110 may perform the measurements on the RS(s) already. However, the terminal device 110 receives no grant for the L3 measurement report although the required measurement results is obtained. In this case, the terminal device 110 cannot transmit the L3 measurement report 243. In some embodiments, the terminal device 110 may determine the PL-RS as known only based on the at least one measurement result e.g. if the target PL-RS derived from TCI activation command is based on the available measurement result at the UE.

Furthermore, in the above embodiments, the PL-RS may be determined as known if one or more the following conditions are met. The PL-RS is determined based on a first reference signal (RS) associated with a measurement result that is included in a L3 measurement report. Additionally or alternatively, the PL-RS is determined based on a second RS associated with a measurement result that is included at least one of a L1 measurement report or the L3 measurement report. Additionally or alternatively, the PL-RS is determined based on at least one of SSB or CSI-RS that are associated with the L3 measurement report. Additionally or alternatively, the PL-RS is quasi co-located (QCLed) with at least one of the SSB or the CSI-RS that are associated with the L3 measurement report. Additionally or alternatively, the cell activation command is received within a second time period upon last reference signal resource associated with the L3 measurement report, for example, the second time period may be 1280 ms.

In a specific example, the one or more conditions for determining that the PL-RS is known may include that the PL-RS is determined based on a reference signal (RS) used for measuring and included as result in the L3 report, if the UE reports L3 measurement results after receiving SCell activation command. Additionally or alternatively, the PL-RS is determined based on the same RS as used for L3 measurement results (if any) or L1-RSRP reporting if the UE does not report L3 measurement results after receiving SCell activation command. Additionally or alternatively, the PL-RS is determined based on one of the SSBs/CSI-RS which was reported in the L3 report or the PL-RS is QCL-ed with one of the SSBs/CSI-RS which was reported in the L3 report. Additionally or alternatively, the PUCCH SCell activation command is received within a certain time period upon the last transmission of the RS resource used for the L3 report.

Without any limitation, the above embodiments may be also expressed in the following manner.

---

For the UE capable of L3-MeasUnknownSCellActivation, if the UE is provided with ReportOnScellActivation and it reports valid L3 measurement results after receiving the SCell activation command for unknown SCell, the pathloss reference signal is known for unknown PUCCH SCell during activation if the following conditions are met during the period between the last transmission of the RS resource used for L3 reporting after SCell activation command and the completion of PUCCH SCell activation, where the RS resource is the target pathloss reference signal or QCLed (with Type D) to the target pathloss reference signal.
- The PUCCH SCell activation command is received within 1280 ms upon the last transmission of the RS resource used for the L3 reporting after SCell activation command
- The target pathloss reference signal determination is based on the L3 reporting after SCell activation command, if UE only sends L3 reporting before receiving TCI activation command, or -continued

- The target pathloss reference signal determination is based on either the latest L1-RSRP measurement reporting or the L3 reporting after SCell activation command, if UE reports both before receiving TCI activation command
- The target pathloss reference signal remains detectable during the PUCCH SCell activation period
  - SNR of the target pathloss reference signal≥−3dB
- The associated SSBs with the target pathloss reference signal remain detectable during the PUCCH SCell activation period
  - SNR of the associated SSB ≥−3dB Otherwise, the pathloss reference signal is known for unknown PUCCH SCell during activation if the following conditions are met during the period between the last transmission of the RS resource used for L1-RSRP measurement reporting and the completion of PUCCH SCell activation, where the RS resource is the target pathloss reference signal or QCLed (with Type D) to the target pathloss reference signal.
- The PUCCH SCell activation command is received within 1280 ms upon the last transmission of the RS resource used for L1-RSRP measurement reporting
- The target pathloss reference signal determination is based on the latest L1-RSRP measurement reporting
- The target pathloss reference signal remains detectable during the PUCCH SCell activation period
- SNR of the target pathloss reference signal ≥−3dB
- The associated SSBs with the target pathloss reference signal remain detectable during the PUCCH SCell activation period
  - SNR of the associated SSB ≥−3dB Otherwise, the pathloss reference signal is unknown.

The above delay requirement shall apply provided that:
- The target pathloss reference signal determined during PUCCH SCell activation is known otherwise longer activation time is expected if the pathloss reference signal is unknown; and
- The RA on PUCCH SCell is not interrupted by the RA on PCell otherwise additional delay to activate the SCell is expected; and
- No SRS carrier based switching or SRS antenna port switching occurs during the SCell activation procedure otherwise the PUCCH SCell activation delay can be extended.

After determining (245) that the PL-RS is known, the terminal device 110 activates (250) the SCell within a first time period. In an example, the first time period may be the delay requirement associated with SCell activation. In some embodiments, the terminal device 110 may activate the SCell by transmitting a valid CSI report 252 to the network device 254 on the SCell. Correspondingly, the network device 120 may receive (254) the valid CSI report 252. As mentioned above, to transmit the CSI report 252, the terminal device 110 may calculate the uplink transmit power based on the determined PL-RS. As mentioned above, to transmit the valid CSI report on the SCell, a certain number of further PL-RS samples are required to be measured to determine the UL transmit power. In turn, if the PL-RS may be determined as known based on the L3 measurement report, the uplink transmit power may be also determined directly without further measurements, or determined with a lower number of PL-RS samples, for example, three-PL-RS samples. This is because the required measurements have been performed for the L3 measurement report.

In some embodiments, if the PL-RS is determined as known based on the L3 measurement report, further measurements of the PL-RS samples may be not required anymore since the L3 measurement report have more PL-RS measurements than the L1 measurement report already. Alternatively, if the PL-RS is determined as known based on the L3 measurement report, the terminal device 110 may perform less number of further measurements (for example, requiring only two further PL-RSs) on the determined PL-RS compared to the L1 measurement report. In some embodiments, the terminal device 110 may inform the required further measurements to the network device 120.

For example, the terminal device 110 may transmit (201) a first indication 203 to a network device 205, and the first indication may be indicative that the terminal device 110 is capable of or support activating the SCell without a further PL-RS measurement if L3 report is triggered by cell activation command. In this case, if the associated RSs are not required for other purposes, the network device 110 will transmit no associated RSs. Alternatively, the terminal device 110 may transmit (201) a second indication 203 to the network device 120, and the second indication may be indicative that the terminal device 110 is capable of or support activating the SCell with a first number of PL-RS measurements if L3 report is triggered by cell activation command. In turn, after receiving (205) the second indication 203, the network device 120 may transmit the first number of further PL-RS(s) (or related RS, for example, RSs that is QCLed with the PL-RS). In this way, upon receiving (244) the TCI activation command 243 indicating the determined/target PL-RS, the terminal device 110 may perform a measurement on the first number of PL-RS measurements to determine a transmit power for example after receiving TCI activation command. With the determined transmit power, the terminal device 110 may transmit a CSI-RS report on the SCell for activating the SCell. In this way, since the first number of PL-RS samples is less than the number of further PL-RS samples required for the cell activation as shown in FIG. 1B, the time period required to activate the SCell can be reduced. Only for discussion clarity, a specific example of the SCell activation is illustrated in FIG. 3.

Figure 3:
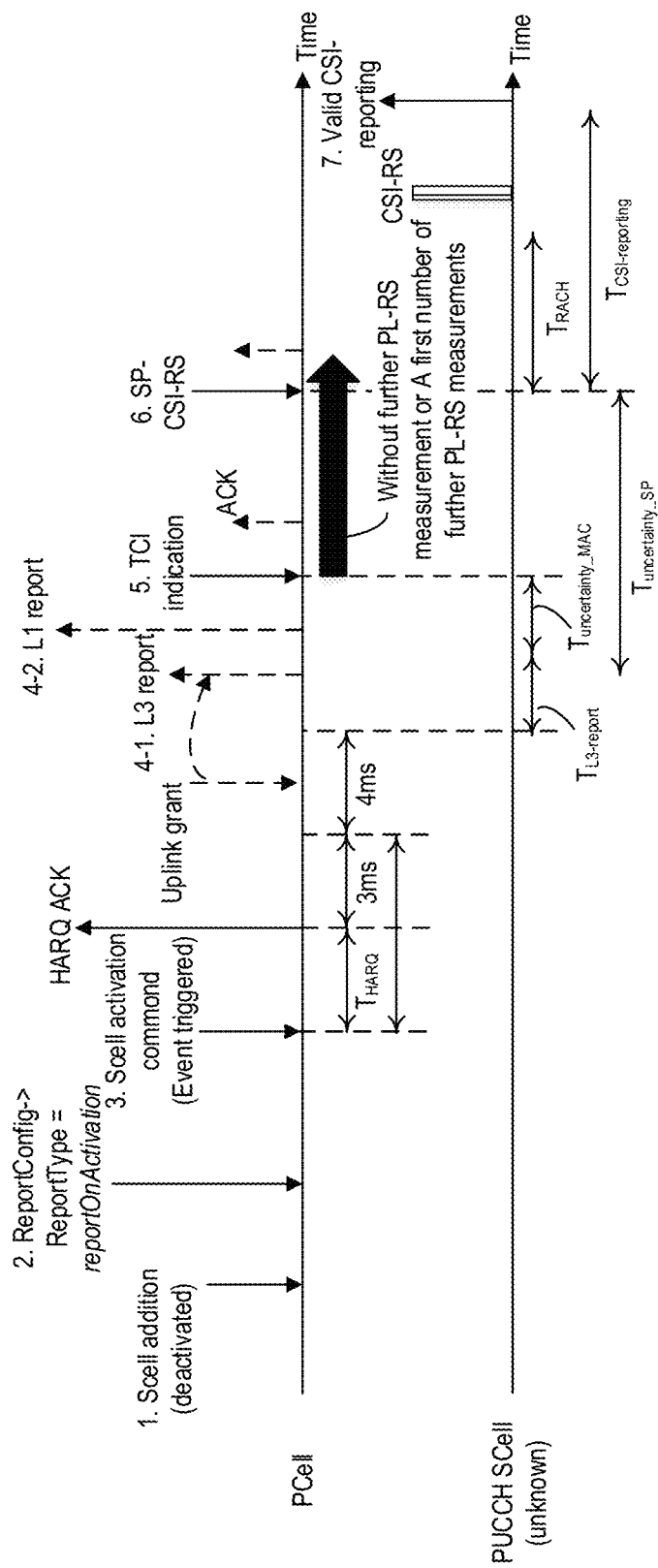
FIG. 3 illustrates an example of SCell activation procedure based on measurement results, or at least one of L3 measurement report and L1 measurement report according to example embodiments of the present disclosure.

FIG. 3 illustrates an example of SCell activation procedure based on measurement results, or at least one of L3 measurement report and L1 measurement report according to example embodiments of the present disclosure. Without any limitation, the SCell activation procedure in FIG. 3 may be an example of process 200 in FIG. 2.

As shown in FIG. 3, in the message #1 (i.e., 1. SCell addition), the network (for example, the network device 120) configures the SCell as PUCCH SCell and adds this cell into CA operation. In message #2 (i.e., Report configuration), the network configures SCell activation triggered L3 report e.g. ReportOnActivation on the PUCCH SCell. The ULE (for example, the terminal device 110) is able to transmit a L3 reporting after receiving SCell activation command if there is a valid measurement result. Before receiving SCell activation command, the UE may indicate its capability (for example, the first capability indication or the second capability indication) of skipping PL-RS measurement if PL-RS is known, or indicate the number of samples (for example, the first number of PL-RSs) if PL-RS measurement is still needed.

In the message #3 (i.e. SCell activation command), UE receives SCell activation command to activate the PUCCH SCell and sends HARQ ACK. The UE evaluates if there is valid measurement result available when receiving SCell activation command, and prepares the L3 reporting accordingly. In message #4 (i.e., L3 report), UE sends L3 report on the received UL grant. Alternative to message #4, the UE may not send L3 report as there is no UL grant available within a certain time margin. The UE may send L1-RSRP reporting instead. When the UE receives the TCI activation command in message #5, the UE determines PL-RS that has been included into the L1-RSRP report or that UE has available PL-RS measurement results and starts measuring PL-RS based on its capability.

In message #5 (i.e., TCI indication), UE receives TCI activation command indicating which TCI state to be activated. Based on the TCI activation command, the UE can determine the associated PL-RS. UE determines the PL-RS that has been included into the L3 report and considers the PL-RS as known. Furthermore, UE starts measuring PL-RS based on its capability. In message #6, network sends reference signal e.g. SP-CSI-RS for channel measurement and UE will measure and send CSI reporting using the UL Tx power determined from PL-RS. Meanwhile, UE may do random access procedure to acquire UL timing if there is no valid TA. It is to be understood that the procedure of an unknown PUCCH SCell activation with L3 report as shown in FIG. 3 is only an example, without any limitation.

In view of the above, how to determine if Pathloss reference signal (PL-RS) is known or unknown for PUCCH SCell activation can be appropriately addressed even if the SCell activation can trigger more than one type of measurement report.

Figure 4:
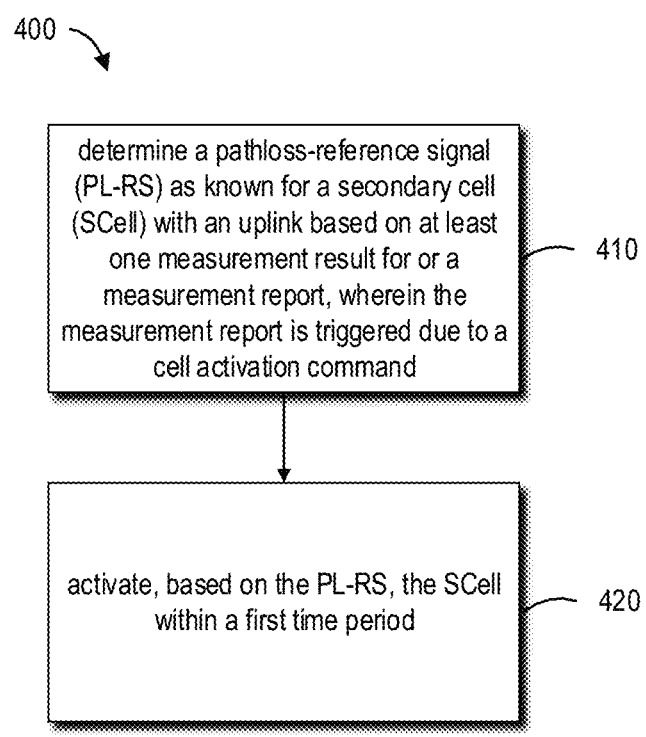
FIG. 4 illustrates an example flowchart of a method implemented at a terminal device according to example embodiments of the present disclosure.

FIG. 4 shows a flowchart of an example method 400 implemented at a terminal device (for example, the terminal device 110) in accordance with some embodiments of the present disclosure. For the purpose of discussion, the method 400 will be described from the perspective of the terminal device 110 with reference to FIG. 1.

At 410, the terminal device 110 determines a pathloss-reference signal (PL-RS) as known for a secondary cell (SCell) with an uplink based on at least one measurement result or a measurement report. The measurement report is triggered due to a cell activation command. At 420, the terminal device 110 activates, based on the PL-RS determined as known, the SCell within a first time period.

In some embodiments, the measurement report comprises at least one of the following: a layer 3 (L3) measurement report comprising the at least one measurement result; or a layer 1 (L1) measurement report comprising the at least one measurement result.

In some embodiments, the terminal device 110 may determine the PL-RS as known for the SCell by at least one of the following: determining the PL-RS as known based on an L3 measurement report after a secondary cell (SCell) activation command; or determining the PL-RS as known based on both the L3 measurement report and a L1 measurement report after the SCell activation command.

In some embodiments, the terminal device 110 may determine the PL-RS as known for the SCell by: receiving an SCell activation command from a network device; and determining the PL-RS as known based on the at least one measurement result for the measurement report in the case that transmitting no measurement report.

In some embodiments, the terminal device 110 may determine the PL-RS as known based on one or more of the following conditions are fulfilled: the PL-RS is determined based on a first reference signal (RS) associated with a measurement result that is included in a L3 measurement report; or the PL-RS is determined based on a second RS associated with a measurement result that is included at least one of a L1 measurement report or the L3 measurement report.

In some embodiments, the terminal device 110 may determine the PL-RS as known based on one or more of the following conditions are fulfilled: the PL-RS is determined based on at least one of a synchronization signal and physical broadcast channel (SSB) or a channel state information-reference signal (CSI-RS) that are associated with the L3 measurement report; the PL-RS is quasi co-located (QCLed) with the at least one of the SSB or the CSI-RS that are associated with the L3 measurement report.

In some embodiments, the terminal device 110 may determine the PL-RS as known based on that the cell activation command is received within a second time period upon last reference signal resource associated with the L3 measurement report.

In some embodiments, the terminal device 110 may further receive, from a network device, a reporting configuration for a L3 measurement report triggered by the cell activation command.

In some embodiments, the terminal device 110 may further: transmit, to a network device, a first indication being indicative that the terminal device supports activating the SCell without a further PL-RS measurement; or transmit, to the network device, a second capability indication being indicative that the terminal device supports activating the SCell with a first number of PL-RS measurements.

In some embodiments, the terminal device 110 transmits the second capability indication, and the terminal device 110 may further: perform a measurement on the first number of PL-RS measurements to determine a transmit power; and activate the SCell by transmitting a CSI-RS report with the determined transmit power.

In some embodiments, the SCell comprises a physical uplink control channel (PUCCH) SCell. In some embodiments, the PUCCH SCell is unknown to the terminal device.

Figure 5:
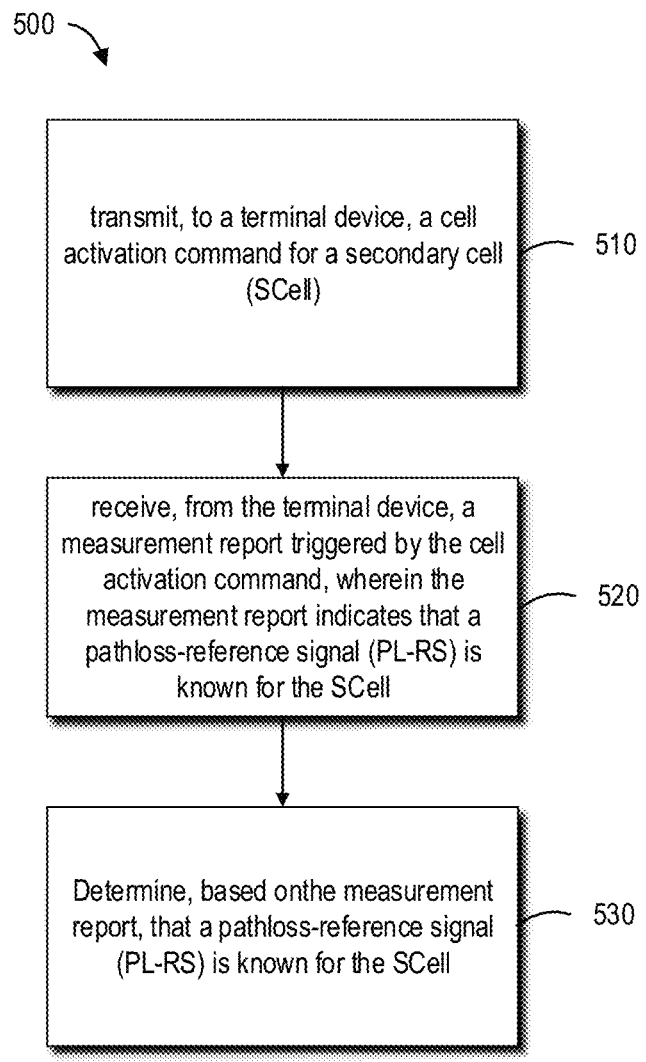
FIG. 5 illustrates an example flowchart of a method implemented at a network device according to example embodiments of the present disclosure.

FIG. 5 shows a flowchart of an example method 500 implemented at a network device (for example, the network device 120) in accordance with some embodiments of the present disclosure. For the purpose of discussion, the method 500 will be described from the perspective of the network device 120 with reference to FIG. 1.

At 510, the network device 120 transmits, to a terminal device 110, a cell activation command for a secondary cell (SCell). At 520, the network device 120 receives, from the terminal device, a measurement report triggered by the cell activation command. At 530, the network device 120 determines, based on the measurement report, that a pathloss-reference signal (PL-RS) is known for the SCell.

In some embodiments, the measurement report comprises at least one of the following: a layer 3 (L3) measurement report; or a layer 1 (L1) measurement report.

In some embodiments, the PL-RS is determined as known for the SCell based on one or more of the following conditions are fulfilled: the PL-RS is determined based on a first reference signal (RS) associated with a measurement result that is included in a L3 measurement report; or the PL-RS is determined based on a second RS associated with a measurement result that is included at least one of a L1 measurement report or the L3 measurement report.

In some embodiments, the PL-RS is determined as known for the SCell based on one or more of the following conditions are fulfilled: the PL-RS is determined based on at least one of a synchronization signal and physical broadcast channel (SSB) or a channel state information-reference signal (CSI-RS) that are associated with the L3 measurement report; or the PL-RS is quasi co-located (QCLed) with the at least one of the SSB or the CSI-RS that are associated with the L3 measurement report.

In some embodiments, the PL-RS is determined as known for the SCell based on that the activation command is received within a second time period upon last reference signal resource associated with the L3 measurement report.

In some embodiments, the network device 120 may further: receive, from the terminal device, a first capability indication that the terminal device supports activating the SCell without a further PL-RS measurement; or receive, from the terminal device, a second capability indication that the terminal device supports activating the SCell with a first number of PL-RS measurements.

In some embodiments, the second capability indication is received, and the network device 120 may further transmit, to the terminal device, the first number of PL-RS measurements based on the second capability indication.

In some embodiments, the SCell comprises a physical uplink control channel (PUCCH) SCell. In some embodiments, the PUCCH SCell is unknown to the terminal device.

Figure 6:
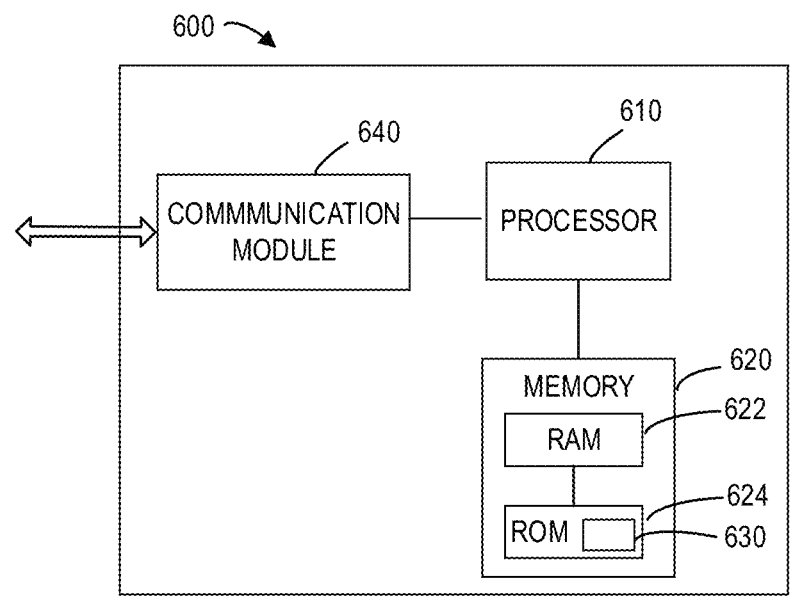
FIG. 6 illustrates an example simplified block diagram of an apparatus that is suitable for implementing embodiments of the present disclosure.

FIG. 6 is a simplified block diagram of a device 600 that is suitable for implementing embodiments of the present disclosure. The device 600 may be provided to implement the communication device, for example the terminal device 110 and the network device 120 as shown in FIG. 1A. As shown, the device 600 includes one or more processors 610, one or more memories 640 coupled to the processor 610, and one or more transmitters and/or receivers (TX/RX) 640 coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a read only memory (ROM) 1324, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A program 630 includes executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program so that the device 1300 may perform any process of the disclosure as discussed with reference to FIGS. 2 to 5. The embodiments of the present disclosure may also be implemented by hardware or by a combination of software and hardware.

Figure 7:
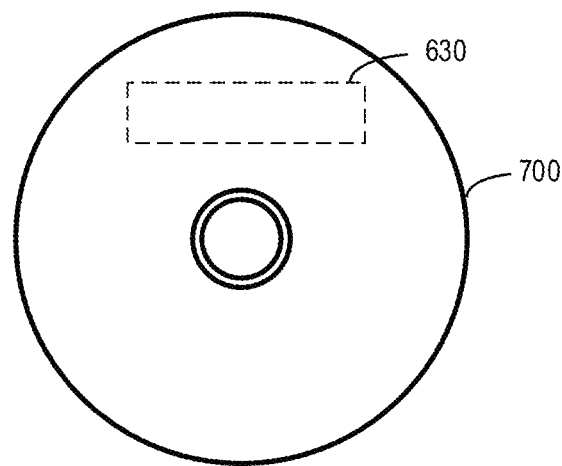
FIG. 7 illustrates an example block diagram of an example computer readable medium in accordance with some embodiments of the present disclosure.

In some embodiments, the program 630 may be tangibly contained in a readable storage medium which may be included in the device 600 (such as in the memory 620) or other storage devices that are accessible by the device 600. The device 600 may load the program 630 from the storage medium to the RAM 622 for execution. The storage medium may include any types of tangible non-volatile storage, such as ROM, EPROM, a flash memory, a hard disk, CD, DVD, and the like. FIG. 7 shows an example of the storage medium 700 in form of CD or DVD. The storage medium has the processor instructions 630 stored therein.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one program product tangibly stored on a non-transitory readable storage medium. The program product includes executable instructions, such as those included in program modules, being executed in a device on a target real or virtual processor, to carry out process 200, the method 400 or 500 as described above with reference to FIG. 2 to FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the program codes or related data may be carried by any suitable carrier to enable the device, apparatus or processor to perform various processes and operations as described above. Examples of the carrier include a signal, readable storage medium, and the like.

The readable medium may be a readable signal medium or a readable storage medium. A readable storage medium may include but not limited to an electronic, magnetic, optical, electromagnetic, infrared, or semiconductor system, apparatus, or device, or any suitable combination of the foregoing. More specific examples of the readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
    at least one memory; and
    at least one processor coupled with the at least one memory and configured to cause the terminal device to:
        receive a cell activation command for a secondary cell (SCell), which is unknown to the terminal device;
        determine a pathloss-reference signal (PL-RS) as known for the SCell based on at least a layer 3 (L3) measurement report, wherein the L3 measurement report is triggered due to the cell activation command; and
        activate, based on the determination of the PL-RS as known, the SCell within a first time period.
2. The terminal device of claim 1, wherein the L3 measurement report comprises at least one measurement result.

3. The terminal device of claim 1, wherein the terminal device is caused to determine the PL-RS as known for the SCell by at least one of the following:
    determining the PL-RS as known based on an L3 measurement report after the SCell activation command; or
    determining the PL-RS as known based on both the L3 measurement report and a L1 measurement report after the SCell activation command.
4. The terminal device of claim 1, wherein the terminal device is caused to determine the PL-RS as known for the SCell by:
    receiving an SCell activation command from a network device; and
    determining the PL-RS as known based on the at least one measurement result for the measurement report in the case of transmitting no measurement report.
5. The terminal device of claim 1, wherein the terminal device is caused to determine the PL-RS as known based on one or more of the following:
    the PL-RS is determined based on a first reference signal (RS) associated with a measurement result that is included in the L3 measurement report;
    the PL-RS is determined based on a second RS associated with a measurement result that is included at least in one of a L1 measurement report or the L3 measurement report;
    the PL-RS is determined based on at least one of a synchronization signal and physical broadcast channel (SSB) or a channel state information-reference signal (CSI-RS) that are associated with the L3 measurement report; or
    the PL-RS is quasi co-located (QCLed) with the at least one of the SSB or the CSI-RS that are associated with the L3 measurement report.
6. The terminal device of claim 1, wherein the terminal device is caused to determine the PL-RS as known based on that: the activation command is received within a second time period from a last reference signal resource associated with the L3 measurement report.
7. The terminal device of claim 1, wherein the terminal device is further caused to:
    receive, from a network device, a reporting configuration for the L3 measurement report triggered by the cell activation command.
8. The terminal device of claim 1, wherein the terminal device is further caused to:
    transmit, to a network device, a first indication being indicative that the terminal device supports activating the SCell without a further PL-RS measurement; or
    transmit, to the network device, a second indication being indicative that the terminal device supports activating the SCell with a first number of PL-RS measurements.
9. The terminal device of claim 8, wherein the terminal device is caused to transmit the second capability indication, and wherein the terminal device is further caused to:
    perform a measurement on the first number of PL-RS measurements to determine a transmit power; and
    activate the SCell by transmitting a CSI-RS report with the determined transmit power.
10. The terminal device of claim 1, wherein the SCell comprises a physical uplink control channel (PUCCH) SCell.
11. The terminal device of claim 10, wherein the PUCCH SCell is unknown to the terminal device.

12. A network device, comprising:
at least one memory; and
at least one processor coupled with the at least one memory and configured to cause the network device to:
transmit, to a terminal device, a cell activation command for a secondary cell (SCell);
receive, from the terminal device, a measurement report triggered by the cell activation command; and
determine, based on the measurement report, that a pathloss-reference signal (PL-RS) is known for the SCell,
wherein the measurement report comprises a layer 3 (L3) measurement report.

13. The network device of claim 12, wherein the PL-RS is determined as known for the SCell based on one or more of the following conditions:
the PL-RS is determined based on a first reference signal (RS) associated with a measurement result that is included in the L3 measurement report;
the PL-RS is determined based on a second RS associated with a measurement result that is included at least in one of a L1 measurement report or the L3 measurement report;
the PL-RS is determined based on at least one of a synchronization signal and physical broadcast channel (SSB) or a channel state information-reference signal (CSI-RS) that are associated with the L3 measurement report; or
the PL-RS is quasi co-located (QCLed) with the at least one of the SSB or the CSI-RS that are associated with the L3 measurement report.

14. The network device of claim 12, wherein the PL-RS is determined as known for the SCell based on that: the activation command is received by the terminal device within a second time period from a last reference signal resource associated with the L3 measurement report.

15. The network device of claim 12, wherein the network device is further caused to:
receive, from the terminal device, a first indication being indicative that the terminal device supports activating the SCell without a further PL-RS measurement; or
receive, from the terminal device, a second indication being indicative that the terminal device supports activating the SCell with a first number of PL-RS measurements.

16. The network device of claim 15, wherein the second indication is received, and wherein the network device is further caused to:
transmit, to the terminal device, the first number of PL-RS measurements based on the second capability indication.

17. The network device of claim 12, wherein the SCell comprises a physical uplink control channel (PUCCH) SCell.

18. The network device of claim 17, wherein the PUCCH SCell is unknown to the terminal device.

19. A method, comprising:
receiving, by a terminal device, a cell activation command for a secondary cell (SCell), which is unknown to the terminal device;
determining, by the terminal device, a pathloss-reference signal (PL-RS) as known for the SCell based on at least a layer 3 (L3) measurement report, wherein the L3 measurement report is triggered due to the cell activation command; and
activating, based on the determination of the PL-RS as known, the SCell within a first time period.

20. The method of claim 19, wherein determining the PL-RS as known for the SCell comprises at least one of the following:
determining the PL-RS as known based on an L3 measurement report after the SCell activation command; or
determining the PL-RS as known based on both the L3 measurement report and a L1 measurement report after the SCell activation command.

* * * * *